(12) United States Patent
Schneeman

(10) Patent No.: US 10,791,073 B2
(45) Date of Patent: Sep. 29, 2020

(54) EVENT DETECTION USING INQUIRIES

(71) Applicant: HomeAway.com, Inc., Austin, TX (US)

(72) Inventor: Brent T. Schneeman, Austin, TX (US)

(73) Assignee: HomeAway.com, Inc., Austin, TX (US)

( * ) Notice: Subject to any disclaimer, the term of this patent is extended or adjusted under 35 U.S.C. 154(b) by 101 days.

(21) Appl. No.: 14/973,651

(22) Filed: Dec. 17, 2015

(65) Prior Publication Data

US 2017/0180280 A1    Jun. 22, 2017

(51) Int. Cl.
| | |
|---|---|
| H04L 12/58 | (2006.01) |
| G06Q 30/02 | (2012.01) |
| H04L 29/08 | (2006.01) |
| G06F 16/907 | (2019.01) |
| G06F 16/9537 | (2019.01) |

(52) U.S. Cl.
CPC .......... H04L 51/046 (2013.01); G06F 16/907 (2019.01); G06F 16/9537 (2019.01); G06Q 30/0252 (2013.01); H04L 67/18 (2013.01); H04L 67/22 (2013.01)

(58) Field of Classification Search
CPC . H04L 51/046; H04L 67/18; G06F 17/30401; G06F 17/30557
USPC ........................................................ 709/206
See application file for complete search history.

(56) References Cited

U.S. PATENT DOCUMENTS

| | | | | |
|---|---|---|---|---|
| 9,460,195 B1* | 10/2016 | Zhang | .................... | G06F 17/28 |
| 9,652,530 B1* | 5/2017 | Bendersky | ........ | G06F 17/30705 |
| 2004/0030603 A1* | 2/2004 | Grundfest | .............. | G06Q 10/10 |
| | | | | 705/26.1 |
| 2005/0091287 A1* | 4/2005 | Sedlar | .................... | G06F 16/188 |
| 2005/0108244 A1* | 5/2005 | Riise | .................... | G06F 17/3087 |
| 2007/0192474 A1* | 8/2007 | Decasper | .............. | H04L 67/306 |
| | | | | 709/223 |
| 2007/0299815 A1* | 12/2007 | Starbuck | ........... | G06F 17/30648 |
| 2008/0010259 A1* | 1/2008 | Feng | .................. | G06F 17/3087 |
| 2010/0279667 A1* | 11/2010 | Wehrs | .................... | G06Q 30/02 |
| | | | | 455/414.1 |
| 2014/0324966 A1* | 10/2014 | Farnham | ................. | H04L 51/20 |
| | | | | 709/204 |
| 2015/0082212 A1* | 3/2015 | Sharda | .................... | H04L 67/26 |
| | | | | 715/764 |

(Continued)

Primary Examiner — Meng Vang

(74) Attorney, Agent, or Firm — Knobbe Martens Olson & Bear LLP

(57) ABSTRACT

Inquiry data from one or more sources (e.g., client devices) may be analyzed to determine if key terms, date terms, and locality terms are indicative of an event to occur at a locality during one or more dates. Events that are detected may be communicated (e.g., via an electronic message(s)). An owner of a property may receive the electronic message(s) that are communicated for detected events and the owner may act to garner interest in stays at their property. Travelers searching for a property to stay at during the event may receive the electronic message(s) in the form of an offer (e.g., an email, a text message, a Tweet, a newsletter, etc.). The inquiry data may be received in real time and/or may be accessed from a data store. The Inquiry data may be curated to remove non-essential information and/or to include edited key terms, date terms, and locality terms.

20 Claims, 7 Drawing Sheets

(56) References Cited

U.S. PATENT DOCUMENTS

2015/0161719 A1* 6/2015 Abhyanker ........ G06Q 30/0645
                                                      705/39
2015/0199754 A1* 7/2015 Greystoke .......... G06Q 30/0619
                                                      705/307

* cited by examiner

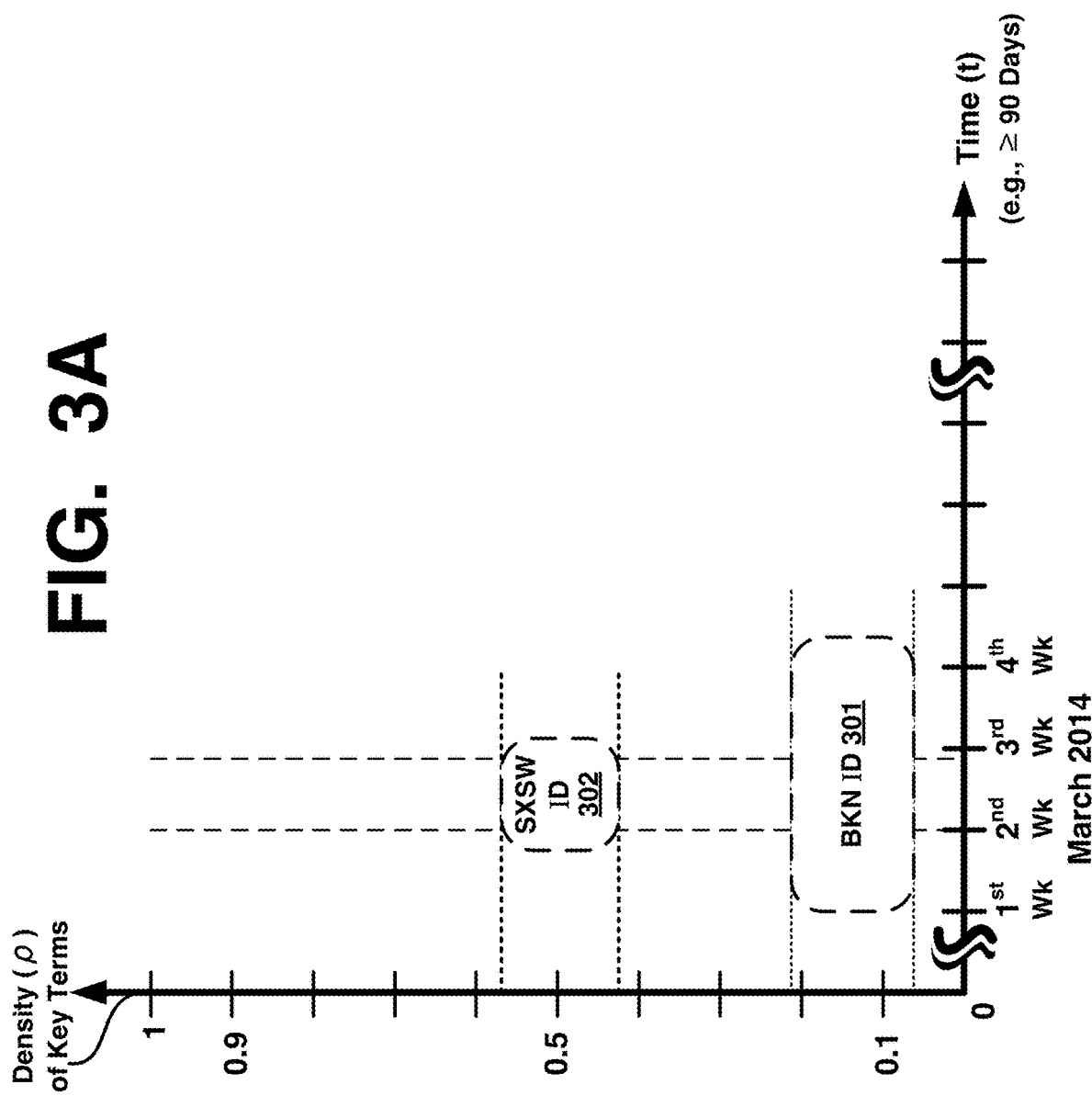

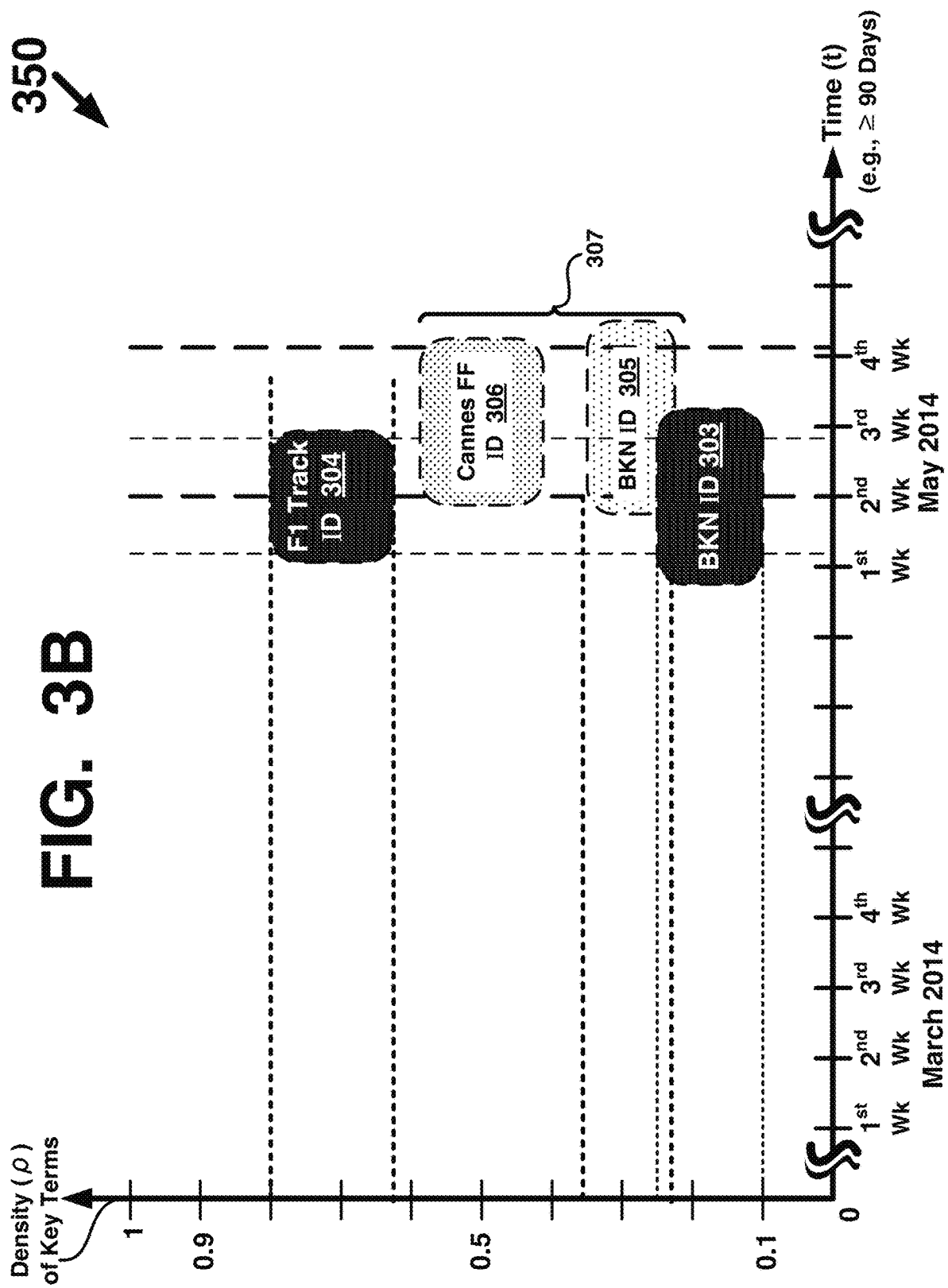

EVENT DETECTION USING INQUIRIES

FIELD

The present application relates generally to systems, software, electronic messaging, and electronic commerce. More specifically, systems, methods and software to detect events using inquiries are disclosed.

BACKGROUND

An owner (e.g., an actual owner or agent acting on behalf of the actual owner) of a res, such as a property for lease, sale or rent, may not always be aware of interest in their property (e.g., by a potential renter or buyer) that may arise due to an event that may occur in a vicinity in which their property is located. In some cases, an owner may be a person who is very busy and may not have the time and/or the resources to constantly monitor various forms of communication and/or information to obtain data they may use in making a determination as to whether or not a demand exists (e.g., now or at a future time) for a transaction related to their property (e.g., a buyer wanting to lease, sale or rent the property), where the demand may be driven by an event that is geographically local to the owner's property (e.g., in the same city, town, resort, zip code, street, county, or in the vicinity, etc.).

Thus, there is a need for systems, methods and software that automatically detects events using electronic information.

BRIEF DESCRIPTION OF THE DRAWINGS

Various embodiments or examples ("examples") of the present application are disclosed in the following detailed description and the accompanying drawings. The drawings are not necessarily to scale:

FIG. 3A depicts one example of a graph of key term density and background noise of inquiry data versus time;

FIG. 3B depicts another example of a graph of key term density and background noise of inquiry data versus time;

DETAILED DESCRIPTION

Various embodiments or examples may be implemented in numerous ways, including as a system, a process, a method, an apparatus, a user interface, or a series of program instructions on a non-transitory computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

Figure 1:
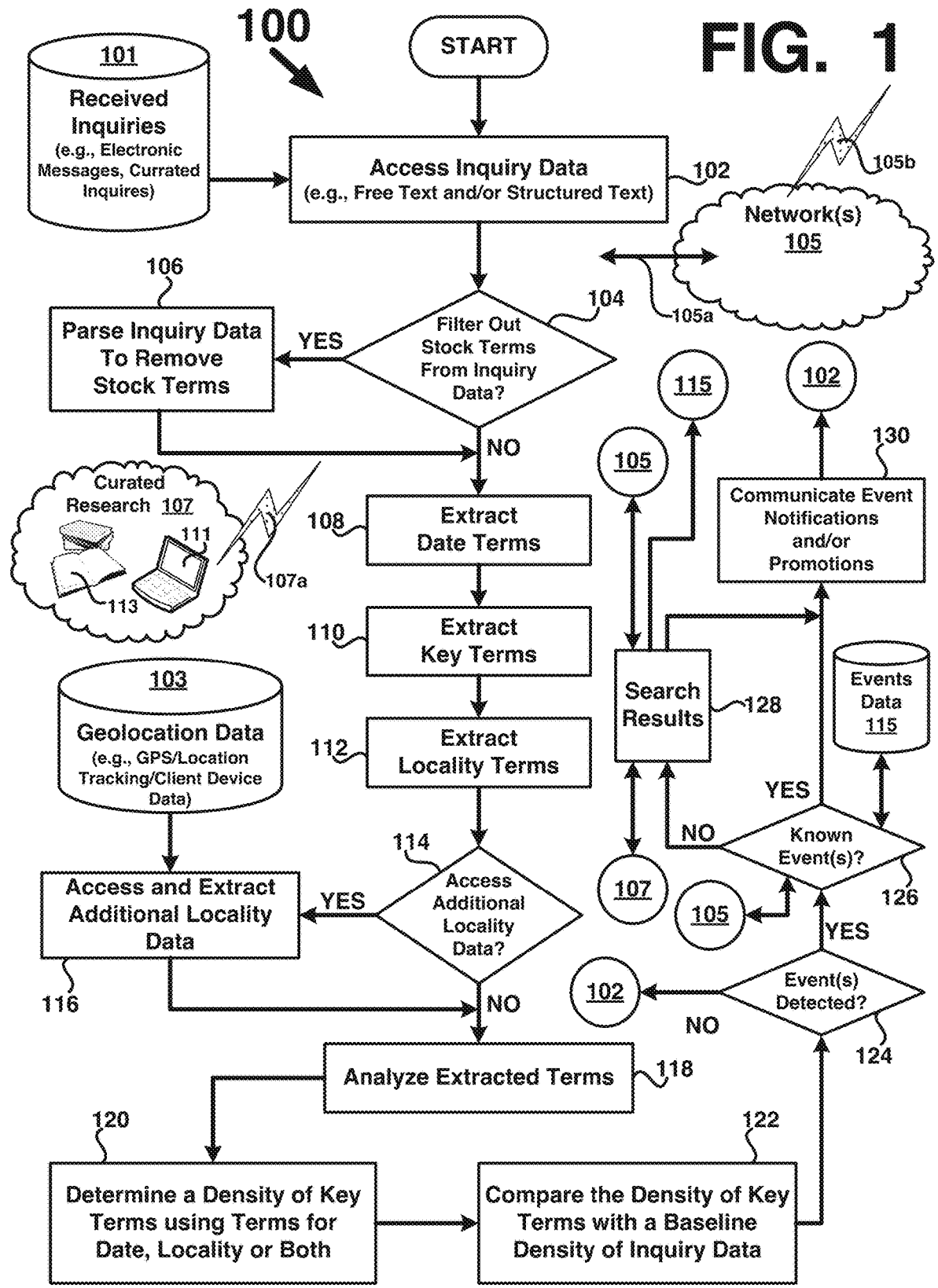
FIG. 1 depicts one example of flow diagram for event detection using inquiries.

FIG. 1 depicts one example of flow diagram 100 for event detection using inquiries. At a stage 102 inquiry data may be accessed from one or more data sources (e.g., a data store, data base (DB), Cloud storage, the Internet, RAID, NAS, hard drive, SSD, etc.). As one example, a data store 101 may include inquires in one or more forms or formats, such as electronic messages, curated inquiries or others. Inquiry data that is accessed at the stage 102 may include but is not limited to free text, structured text, or both or any other text based or non-text based formats, for example. Free text may include but is not limited to text or other characters or symbols entered by a user using one or more user input devices such as a digit(s) of a hand(s), voice input, hand writing, a keyboard, stylus, touch screen, keypad, or mouse, for example. Free text may be included in an electronic message and may be included in one or more portions of the electronic message (EM) including but not limited to a subject line of the EM, a body of the EM, a notes field of the EM, a comments field of the EM, a header of the EM, and a data payload of the EM, just to name a few. Example EM's include but are not limited to email, text messages, Short Message Service (SMS), push messages, push notifications, instant messages (IM), Tweets, EM's from web sites, web pages, the Internet, the Cloud, voice to text conversion, electronic forms, data entered into a menu, a form, just to name a few. Structured text may include but is not limited to drop down menus on a GUI, an APP (e.g. a mobile APP on a smartphone or tablet) or a dashboard, a check box in a menu, a radio button, a fillable form, an icon selected or otherwise activated on a screen or display of a device, data entered on a web page or web site, etc.

According to some examples, inquiry data may include textual or other forms of data that may be communicated by one party to another party, such as a user (e.g., a traveler or customer) to an owner of a property the traveler is inquiring about (e.g., location, price, availability for a stay date range, etc.). Inquiry data may include comments, notes, queries, questions, statements or other text that may provide a nexus between one or more of location of the property, the stay dates, availability, price, and the like, for example. In some examples, an event that may occur near the location of the property during some portion of the stay date may be described in the text and/or other data in the inquiry.

At a stage 104 a determination may be made as to whether or not to remove (e.g., filter out) stock terms that may be included in the inquiry data. Stock terms may include but are not limited to standard terms or commonly used terms that may be included in an inquiry (e.g., as free text and/or structured text), such as words like: "property"; "rent"; "lease"; "no pets"; "no smoking"; "condo"; "house"; "bedroom"; "hotel"; "apartment"; "bathroom"; "motel"; "parking"; "kitchen"; "garage"; "pool"; and "Jacuzzi" may be removed from the inquiry data. As one example, the inquiry data may be parsed to detect (e.g., using lexical analysis) and to extract stock terms from the inquiry data. If a YES branch is taken from the stage 104, then at a stage 106 the inquiry data may be parsed (e.g., analyzed) to remove stock terms and flow 100 may subsequently resume at another stage, such as a stage 108, for example. On the other hand, if a NO branch is taken from the stage 106, then flow 100 may continue at another stage, such as the stage 108, for example. Stock terms to be removed at the stage 106 may be included in a data base, hash table, lookup table, dictionary, data stored or other location. Stock terms may be dependent on locality (e.g., a specific region, state, country, zip code, postal code, etc.), language (e.g., French, Spanish, Mandarin, Russian, etc.), and stock terms may change over time and may be added to with new stock terms or may be reduced by deleting stock terms.

At the stage 108, date terms may be extracted from the inquiry data. Date terms may include free text, structured text or both. Date terms may include stay dates for traveler's stay at a property. Date terms may include text and/or data that define a beginning stay date (e.g., an arrival date) and an end stay date (e.g., a departure date), a certain number of days and nights of a stay (e.g., three days and two nights beginning on a certain day and ending on a certain day, etc.). Although date terms may be regarded as a type of stock term, date terms may be used at other stages in flow 100 and may not be removed at the stage 106 as described above.

At a stage 110, key terms may be extracted from the inquiry data. Key terms may include free text, structured text or both. One or more key terms may be used to associate an event or events with the need for a place to stay during the event(s). In some examples, key terms may most likely comprise free text that may be entered by a user (e.g., a traveler or customer) in an electronic message (EM) (e.g., an email, text, IM, SMS, or Tweet, etc.), a graphical users interface (GUI), a dash board, in an application (APP) (e.g., on a smartphone, tablet or the like), an application program interface (API), or some other medium. Examples of key terms that may be included in inquiry data may include but are not limited to "South by Southwest", "SXSW", "Match", "Newport Jazz Festival", "Contest", "Film Festival", "Festival", "Tournament", "Championship", "Bowl", "Concert", "F1", "Grand Prix", "Olympics", "Race", etc., just to name a few. Other examples may include but are not limited to names of famous persons, groups, performers, bands, athletes, coaches, performances, entertainers, speaker, authors, politicians, actors and others that may be associated with an event(s).

At a stage 112, one or more locality terms may be extracted from the inquiry data. A locality term may typically constitute a term or terms that identify a location of an event, a location of the property or both. For example, locality terms for a city in the state of Missouri in the United States of America may be "Missouri" for the state and "Branson" for the city located in Missouri. As another example, the locality terms may include but are not limited to "USA", "Missouri", "MO", "Ozark Mountains", a zip code(s) such as "95615" or "95616", and "Branson". In some example a locality term may be of a secondary location that is near a primary location, such as a suburb of a major city. In some examples, the primary location may be the site for a detected event. In other examples, the secondary location may be the site for a detected event. In some examples a locality term may be associated with a location that is within a certain distance (e.g., within a 15 mile radius) from an event and/or another location. In the above example of Branson, Mo., there may be several cities nearby Branson (e.g., 22 cities within a 15 mile radius) one or more of those cities may appear as a locality term in the inquiry data. For example, cities nearby Branson may include "ROCKAWAY BEACH", "WALNUT SHADE, Mo.", "HOLLISTER, Missouri", "OAK GROVE, Ark." or variations of the foregoing. Typically, a locality term that may be included in inquiry data may be of finer granularity that may be used to more closely associate an event with a property near the event, for example. Therefore, the state of "MO" is not as fine grained a determination of a "Bluegrass Festival" to be held in "Branson" as is a location term that includes the word "Branson" or a nearby city/town, even though the word "Branson" may also appear with the word "MO" or "Missouri", for example. In other examples, a locality term may include a term associated with a venue, park, natural attraction, structure, theater, building or the like. As one example, locality terms for Branson, Mo. may include "Silver Dollar City" as a venue (e.g., a theme park) associated with an event in Branson (e.g., the "Bluegrass and BBQ Festival"). The aforementioned date terms may be associated with the event, such as dates "Friday, May 8, 2015-Monday, Jun. 1, 2015" for the 2015 "Bluegrass and BBQ Festival" at "Silver Dollar City" in "Branson" "Mo.", for example.

At a stage 114 a determination may be made as to whether or not to access additional locality data. If a YES branch is taken from the stage 114, then flow 100 may transition to a stage 116 where additional locality data (e.g., locality terms, GPS data, location tracking data, etc.) may be accessed and extracted. In some example, the stage 116 may access geographical location data (e.g., geolocation data) 103 to extract the additional locality data. The additional locality data may include data from a client device used by the user (e.g., a customer or traveler), GPS data, location tracking data, or other forms of locality data. Browser search history, cookies, click through on hyperlinks, web pages visited, IP addresses, EM's transmitted and/or received, cellular towers accessed by a client device, and other forms of data that may be garnered from various systems, devices, and media may be included in the additional locality data. Stage 116 may transition to a stage 118 after the additional locality data has been accessed and extracted. If a NO branch is taken from the stage 114, then flow 100 may transition to another stage, such as the stage 118.

At the stage 118, terms extracted from one or more of the prior stages (e.g., 108, 110, 112, 116) may be analyzed. A semantic analysis tool may be used to analyze the extracted terms for terms related to locality (e.g., in a region around a town, a county, a city, etc.), dates for key terms such as events or other activities that may be associated with the locality and/or date terms. For example, analysis of extracted terms at the stage 118 may include extracting from inquiry data "Austin, Tex." as locality terms, dates "Oct. 31, 2014 to Nov. 2, 2014" as date terms, and "UNITED STATES GRAND PRIX" as a key term. Other extracted terms from the inquiry data may be key terms or locality terms. For example, "Circuit of The Americas" may be a locality term that specifies a venue (e.g., a F1 race track) for an event and "Austin F1 GP" may be a key term that specifies an event (e.g., an F1 Grand Prix race to be held in Austin, Tex.). In the above example, a traveler may have include those terms in an EM or other communication that may be transmitted or otherwise communicated to an owner or an agent for the owner as in inquiry for obtaining a place to stay at during the event (e.g., a place in or near Austin, Tex. for the F1 GP race).

At a stage 120 a density of key terms may be determined using one or more of the date terms, the locality terms or both. In flow 100, there may be many received inquiries 101 (e.g., from an inquiry feed) that are made by many travelers and communicated to many owners. On a locality basis (e.g., in Austin, Tex. or in Branson, Mo.) a portion of the inquiries for those location may include key terms such as "Bluegrass and BBQ Festival" for the Branson, Mo. locality or "Austin F1 GP" for the Austin, Tex. locality.

At a stage 122 the density of key terms may be compared with a baseline density of inquiry data (e.g., a background noise of inquiry data for a particular locality such as Austin, Tex. or Branson, Mo.). The baseline density may include inquires that do not include key terms. For example, the baseline density of inquiries may be from travelers looking for places to stay that are unrelated to any specific events in the locality. As another example, the baseline density of inquiries may include industry specific stock terms such as "property", "rent", "rental", "lease", "bedrooms", "bathrooms", "kitchen", "parking", "price", "rate", etc., that may be parsed, analyzed and subsequently be disregarded as not being related to one or more events. The comparison of the density of key terms with the baseline density of inquiry data may be used to determine if the density of key terms is higher than the baseline density of inquiry data.

Statistical analysis or other analytical methods may be used to perform the comparison. The statistical analysis or other analytical methods may be implemented in hardware (e.g., a hardware accelerator or circuitry), software (e.g., algorithms, API, etc.) or both. A higher density for the key terms may indicate an event in a locality over a data range. For example, statistical analysis may include but is not limited to applying text analytics (e.g., text mining, text data mining), predictive analytics, sentiment analysis, or other analytical tool(s), to the density of key terms and the baseline density of inquiry data to detect patterns in the density of key terms (e.g., irregular patterns) that are not detected in the baseline density of inquiry data (e.g., regular patterns). As another example, statistical analysis may include applying statistical pattern learning to the detected patterns to extract data representing one or more of clustered text, relevance of text, novelty of text, categorization of text, or sentiment of text, for example. A frequency of word distribution may be analyzed to associate text with events in a locality over a date range, for example. In some examples, in a locality during a data range, received inquiry data (e.g., emails, HTML, Tweets, SMS, text messages, etc.) may be analyzed to determine the number of times one or more key terms appears in the inquiry data (e.g., the number of times text "F1", "Grand Prix", "race", etc. occur in the inquiry data), the number of times the one or more key terms appears in other inquiry data, and optionally, the length of the inquiry data (e.g., emails, HTML, text, Tweets may have different document lengths and/or sizes in bytes). The occurrence of the key terms (e.g., "F1", "Grand Prix", "race") may be compared to the baseline density of inquiry data to detect a pattern of inquires that are unrelated to background noise associated with the baseline density of inquiry data. Machine learning may be applied to the detected pattern to determine if detected key terms are associated with an event that historically has occurred in the selected locality during the date range, or may constitute a new event that may over time be determined (e.g., based on machine learning) to be a one-time event, an occasional event (e.g., not regularly occurring), or a regularly recurring event (e.g., occurs during the second week of May each year), for example.

As another example, of statistical analysis may include determining a frequency of key terms as a function of inverse document frequency (e.g., term frequency-inverse document frequency (tf-idf) or cosine-normalized tf-idf), where each inquiry may constitute a document that may include one or more key terms (e.g., although some inquires may not include any key terms). Key terms may be assigned a weight based on their frequency of occurrence in multiple inquires for a given data range. A weighting factor may be applied to determine which key terms to surface as being most relevant to and/or indicative of an event. For example, key terms may be weighted proportional to key terms frequency (e.g., key terms having higher frequencies are assigned higher weighting factors).

For example, each inquiry may be parsed or otherwise analyzed to detect key terms and determine a key term frequency of the key term in the inquiry (e.g., the number of instances of the key term in the inquiry). An inverse inquiry frequency may be determined based on the number of inquiries out of the total number of inquiries that include the key term. A product of the key term frequency and the inverse inquiry frequency may be calculated (e.g., computed on a compute engine). Optionally, a key term weighting factor may be applied to the product of the key term frequency and the inverse inquiry frequency. Key terms having higher key term frequencies may be assigned a higher key term weighting factor, for example.

At a stage 124 a determination may be made as to whether or not the comparison at the stage 122 detected an event or events. If a NO branch is taken from the stage 124, then flow 100 may transition to another stage, such as back to the stage 102, for example. If a YES branch is taken from the stage 124, then flow 100 may transition to a stage 126.

At the stage 126 a determination may be made as to whether or not the event or events that were detected are known events. A known event may include events that have a history of occurring in the locality (e.g., annually or in some other interval). Known events for a given locality may be included in a data store for events data 115, for example. Events data 115 may be accessed at the stage 126 to determine if the event or events that were detected are included in the events data 115. The same event may be known by different names and/or acronyms, such as "SXSW" for "South by Southwest", for example. Events data 115 may include multiple data entries for different variations for event names. Other data sources (e.g., external or internal sources) may be accessed to determine if an event is known, such as one or more networks 105 (e.g., an external resource, a data repository, the Internet, a Cloud based resource, etc.), for example. Network 105 may include networked resources such as compute engines (e.g., servers, processors, etc.), data stores (e.g., RAID, NAS, data base, etc.), and communications networks (e.g., a wired 105*a* and/or a wireless 105*b* communications network). A search engine or the like may be used to access the network 105 to determine if a an event name used as the search string turns up one or more hits or matches for the event. If the event is a known event, then a YES branch may be taken from the stage 126 and flow 100 may transition to a stage 130.

If the event or events are not known, then a NO branch may be taken from the stage 126 and flow 100 may transition to a stage 128. At the stage 128, a machine search (e.g., via machine learning, artificial intelligence, a search engine, a data base), a curated search or both may be used to find information related to an unknown event. In some examples, the machine search may include using network(s) 105 as described above. In other examples, the curated search may include using data generated responsive to manual input to perform curated research 107. The curated research 107 may constitute use of electronic resources 111 and/or hard copy/textual 113 resources to discover information about the event or events. The curated research 107 may communicate (e.g., with external resources such as network 105, etc.) using wired and/or wireless communications 107*a*. At the stage 128, the results of the curated research 107 may be added to the events data 115 so that in future iterations of flow 100 the event(s) will be known events and the YES branch may be taken from the stage 126.

At the stage 130, event notifications, promotions, and other forms of electronic messages may be communicated to owners of properties in the locality of the events. For example, owners of property listings (e.g., for lease, sale, or rent) in the Austin, Tex. locality may be apprised of a high density of key terms that have been surfacing in received inquiry data that indicates an interest by travelers in obtaining stay dates in Austin, Tex. for one or more detected events, such as the SXSW festival and the F1 GP race at the Circuit of The Americas. Some of the property owners may be unaware of those events and/or a demand for stays at properties in the localities those events occur in. To that end, at the stage 130, the communications may be used to inform the owners and put the owners on notice of a potential to reach out to travelers and/or accept offers from travelers in need of stay date.

Commutation of event notifications and/or promotions may include but is not limited to: electronic messages sent to owners in the form of emails, newsletters, text messages, SMS, Tweets, push messages, push notifications, instant messages, Tweets, or other forms of electronic messaging; advising owners to initiate a search engine optimization (SEO) for their properties or change a SEO mix; acting on behalf of owners to initiate and/or change a SEO; generating ads in print/hard copy media that promote the owner properties in the locality of the event; generating ads in electronic media that promote the owner properties in the locality of the event (e.g., in browsers, APP's, emails, Craigslist, eBay, Zillow, etc.); and communicating electronic messages to travelers whose inquiries are related to the event(s) in the locality, where the electronic message may include available owner properties for the stay dates the traveler included in the inquiry data.

After the stage 130 has completed, flow 100 may transition to another stage, such as back to the stage 102, for example. Flow 100 may repeatedly cycle through one or more of its various stages to process key terms, date terms and locality terms for events occurring over many localities in different states, counties, countries, etc.

Figure 2:
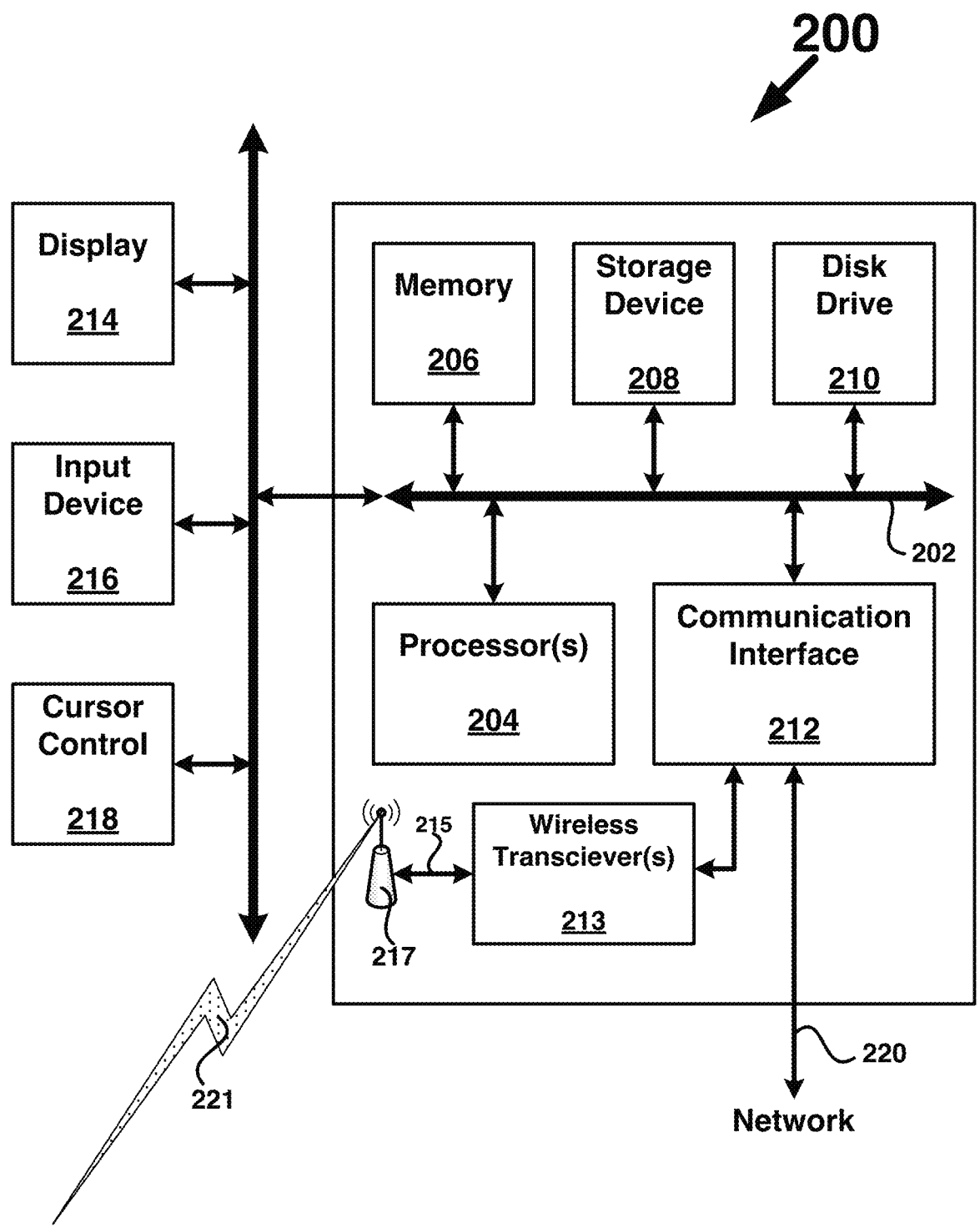
FIG. 2 depicts one example of a computer system.

FIG. 2 depicts one example of a computer system 200. In FIG. 2, computer system 200 may be suitable for use in one or more systems, devices, compute engines, apparatus, client devices, wireless devices, wireless systems, backend systems, front end systems, host devices or others described in reference to FIGS. 1 and 3A-6. In some examples, computer system 200 may be used to implement computer programs, algorithms, applications, configurations, methods, processes, or other software to perform the above-described techniques. Computer system 200 includes a bus 202 or other communication mechanism for communicating information, which interconnects subsystems and devices, such as one or more processors 204 (e.g., µC, µP, DSP, ASIC, FPGA, Baseband, etc.), system memory 206 (e.g., RAM, SRAM, DRAM, Flash), storage device 208 (e.g., Flash, ROM), disk drive 210 (e.g., magnetic, optical, solid state), communication interface 212 (e.g., modem, Ethernet, WiFi, Cellular), display 214 (e.g., CRT, LCD, LED, OLED, touch screen), input device 216 (e.g., keyboard, stylus, touch screen, mouse, track pad), and cursor control 218 (e.g., mouse, trackball, stylus). Some of the elements depicted in computer system 200 may be optional, such as elements 214-218, for example and computer system 200 need not include all of the elements depicted.

According to some examples, computer system 200 performs specific operations by processor 204 executing one or more sequences of one or more instructions stored in system memory 206. Such instructions may be read into system memory 206 from another non-transitory computer readable medium, such as storage device 208 or disk drive 210 (e.g., a HDD or SSD). In some examples, circuitry may be used in place of or in combination with software instructions for implementation. For example, circuitry (e.g., circuitry, an ASIC, a FPGA, logic gates, one or more processors, etc.) may be used to perform hardware acceleration (e.g., for statistical analysis or other type of analysis at stage 122 of flow 100). A high level description language such as VHDL, Verilog, Synopsys or the like may be used to synthesize circuitry that implements the hardware accelerator. The term "non-transitory computer readable medium" refers to any tangible medium that participates in providing instructions to processor 204 for execution. Such a medium may take many forms, including but not limited to, non-volatile media and volatile media. Non-volatile media includes, for example, optical, magnetic, or solid state disks, such as disk drive 210. Volatile media includes dynamic memory, such as system memory 206. Common forms of non-transitory computer readable media includes, for example, floppy disk, flexible disk, hard disk, SSD, magnetic tape, any other magnetic medium, CD-ROM, DVD-ROM, Blu-Ray ROM, USB thumb drive, SD Card, any other optical medium, punch cards, paper tape, any other physical medium with patterns of holes, RAM, PROM, EPROM, FLASH-EPROM, any other memory chip or cartridge, or any other medium from which a computer may read.

Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 202 for transmitting a computer data signal. In some examples, execution of the sequences of instructions may be performed by a single computer system 200. According to some examples, two or more computer systems 200 coupled by communication link 220 (e.g., LAN, Ethernet, PSTN, or wireless network) may perform the sequence of instructions in coordination with one another. Computer system 200 may transmit and receive messages, data, and instructions, including programs, (i.e., application code), through communication link 220 and communication interface 212. Received program code may be executed by processor 204 as it is received, and/or stored in disk drive 210, or other non-volatile storage for later execution. Computer system 200 may optionally include a wireless transceiver 213 in communication with the communication interface 212 and coupled 215 with an antenna 217 for receiving and generating RF signals 221, such as from a WiFi network, WiMAX network, BT radio, Cellular network (e.g., 3G, 4G, 5G, etc.), near field communication (NFC), satellite network, or other wireless network and/or wireless devices, for example. Examples of wireless devices (e.g., client devices) may include but is not limited to those depicted in FIG. 4 such as one or more of devices 410, 111, 417, 423, 455, and 422.

FIG. 3A depicts one example of a graph 300 of key term density and background noise of inquiry data versus time. In FIG. 3A on an x-axis of graph 300, time (t) is represented (e.g., in days, weeks, months, or other units, etc.). Here, time t may be represented in increments of weeks and x-axis may represent a length or period of time t (e.g., such as ≥90 days). A y-axis of graph 300 may represent a density (ρ) of key terms that have been extracted from inquiry data as described above in reference to flow 100 of FIG. 1.

A first event that may have been detected from inquiry data (ID) using flow 100 is denoted as SXSW ID 302 for key terms related to the South by Southwest music festival held in Austin, Tex., typically starting around the second week of March through the third week in March. For example, in the year 2014, SXSW may take place from March 7 through March 16. On the x-axis for the weeks of March 2014, density of key terms for SXSW ID 302 are depicted as spanning from the $2^{nd}$ week to the $3^{rd}$ week of March 2014. Graph 300 also depicts a background noise density of inquiry data denoted as BKN ID 301. A density for BKN ID 301 may be related to inquiries (e.g., inquires unrelated to SXSW) for stay dates in Austin, Tex. in general as may be the case for business travelers, travelers visiting family in the Austin area, travelers visiting the Austin area for reasons other than SXSW, etc. Here, BKN ID 301 approximately spans a density range from below 0.1 to slightly above 0.2; whereas, the density of terms for SXSW ID 302 approximately spans a density range from about 0.35 to about 0.62 in the date range spanning from the $2^{nd}$ week to the $3^{rd}$ week of March 2014. The BKN ID 301 for all four weeks of March 2014 is approximately the same. Therefore, comparison (e.g., using text analytics or other forms of statistical analysis) of the lower density for BKN ID 301 with the higher density for SXSW ID 302 may be indicative of key terms surfaced from received inquiry data (e.g., 101 of FIG. 1) that an event of interest to travelers will occur during the $2^{nd}$ and $3^{rd}$ weeks of March 2014 and notifications/promotions regarding listings available for stay dates in the $2^{nd}$ and $3^{rd}$ weeks of March 2014 may be communicated to owner, traveler or others as described above.

FIG. 3B depicts another example of a graph 350 of key term density and background noise of inquiry data versus time. Graph 350 depicts examples of key term densities vs. back ground noise inquiry data for F1 Track ID 304 in Austin, Tex. and for Cannes FF ID 306 in Cannes, France, and their associated back ground noise inquiry data BKN ID 303 and BKN ID 305, respectively. In graph 350, the depicted times (e.g., weeks in a month) are beyond the March 2014 times described above in reference to graph 300 of FIG. 3A are depicted. Approximately from the $1^{st}$ through the $3^{rd}$ weeks of May 2014, received inquiry data (e.g., 101 of FIG. 1) may include key terms for a Formula 1 Grand Prix racing event to be held at the Circuit of The Americas in Austin, Tex. may surface in the inquiry data. The density of key terms F1 Track ID 304 when compared to the back ground noise inquiry data BKN ID 303 (e.g., for the month of May 2014) may indicate an important event that may be advantageous for owners to act upon. The BKN ID 303 may be different than the back ground noise inquiry data for other periods of time on the x-axis, such as the back ground noise inquiry data for May 2014 being different than the back ground noise inquiry data BKN ID 301 (in graph 300 of FIG. 3A) for March 2014, for example. Although events SWSX and F1 Track, in FIG. 3A and FIG. 3B, respectively, both occur in the same locality (e.g., Austin, Tex.), events that are detected may be geographically diverse. For example, graph 350 depicts the Cannes Film Festival event Cannes FF ID 306 that occurs in Cannes, France. Here, comparison between the density of key terms for Cannes FF ID 306 vs. the back ground noise inquiry data BKN ID 305 in $2^{nd}$ through $4^{th}$ weeks of May 2014 may indicate a high density of inquiries for stay dates in or around the vicinity of Cannes, France for travelers wishing to attend the film festival. Although for purposes of explanation the inquiry data 307 for the Cannes FF ID 306 and BKN ID 305 are depicted on the graph 350 along with events that occur in Austin, Tex. (e.g., F1 Track ID 304), each event may be represented on its own graph.

The comparison of the density of key terms ρ with the back ground noise inquiry data BKN ID may include different amounts of inquiry data. For example, the back ground noise inquiry data BKN ID may be derived from several hundred to several thousand or more inquires that did not surface any key terms and those inquires may only have included stock terms. On the other hand, the inquiry data for the density of key terms ρ may include more inquiries or less inquiries than the back ground noise inquiry data BKN ID. As another example, for a large event, such as a Winter or Summer Olympics where there may be a large number of travelers seeking stay dates in the locality of the games, the density of key terms ρ may include more inquiries than the back ground noise inquiry data BKN ID due to demand for stay dates being driven by the Olympic event. As another example, for an event such as the San Diego Quilt Show 2014, to be held in San Diego, Calif. from September $4^{th}$-$6^{th}$ at the San Diego Convention Center, the back ground noise inquiry data BKN ID may include more inquiry data due to other inquiries for the San Diego locality that may be more related to vacation and tourist attractions in San Diego. However, the key terms surfaced for "Quilt Show", "Quilting Bee", "San Diego Convention Center", etc. may be sufficient to detect an event that may be of interest to owners, travelers, and the like.

Figure 4:
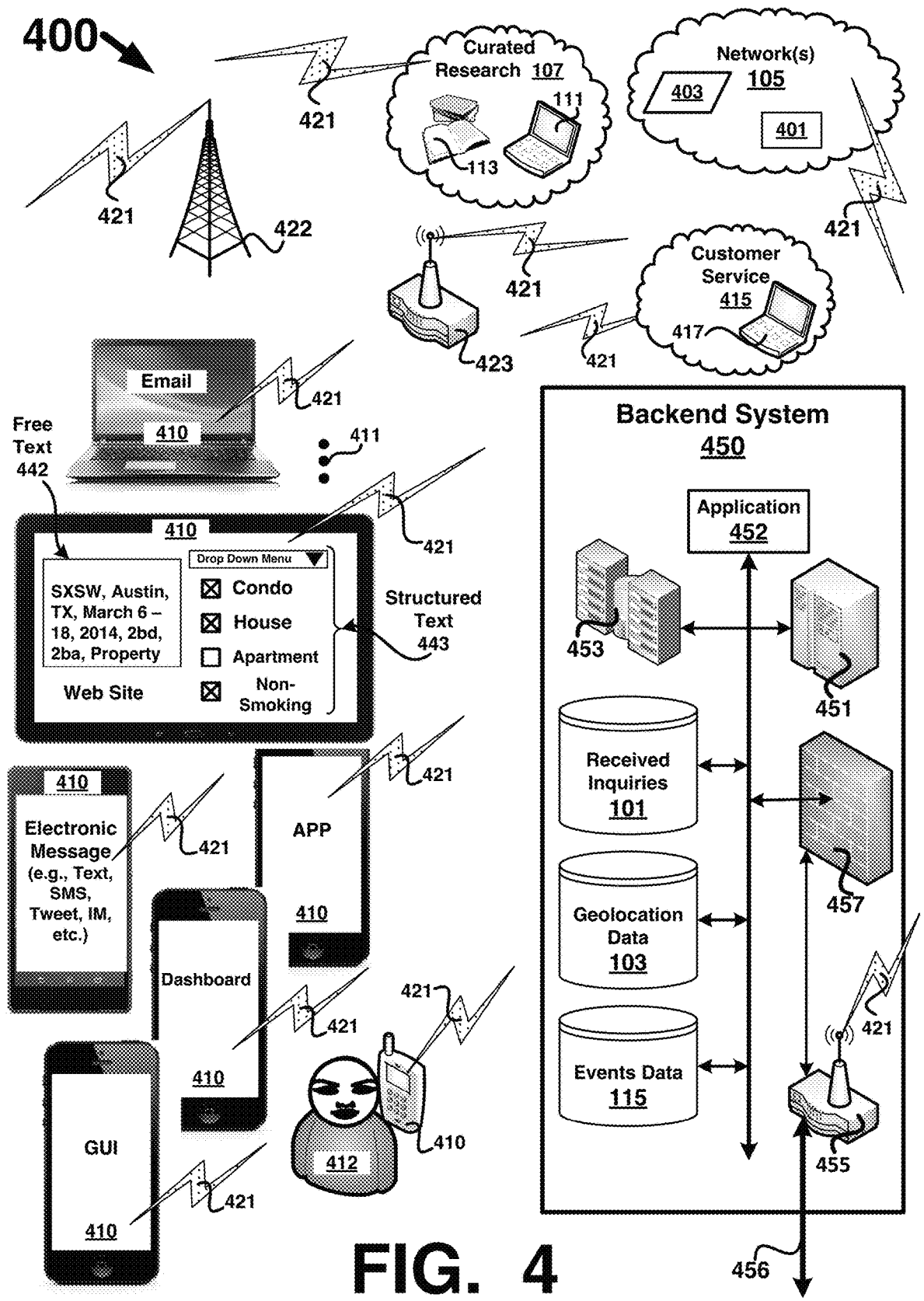
FIG. 4 depicts one example of a backend system to detect events using inquires and communication between the backend system and other systems.

FIG. 4 depicts one example 400 of a backend system to detect events using inquires and communication between the backend system and other systems. In example 400, a backend system 450 may be configured to detect events using inquires and communication between the backend system 450 and other systems (e.g., 410, 422, 423, 107, 415, 105, etc.) is depicted. One or more of the backend systems 450 may include (internally and/or externally) compute resource 451 (e.g., a server or the like), data storage 453 (e.g., RAID or Cloud storage), one or more data stores for received inquiries 101, Geolocation Data 103 and events data 115, a firewall 457 for data/network security, a communication access point 455 (e.g., a wired 456 and/or wireless 421 communications), and an application 452 (e.g., a non-transitory computer readable medium) that may execute on compute resource 451 and/or other compute engines. The exemplary computer system 200 of FIG. 2 may be used to implement compute resource 451 and may also be used to implement other devices and systems depicted in FIG. 4.

Other systems and resources that may communicate 421 (e.g., via wireless and/or wired links) with backend system 450 include but are not limited to network 105, Cellular network 422, wireless network 423, customer service 415, curated research 107, one or more client devices 410, and user 412 (e.g., via client device 410 in communication 421 with customer service 415). Inquires that are received into received inquiries 101 and optionally GEO/Location data stored in Geolocation Data 103 that may be generated by client devices 410 or activities on client devices 410 (e.g., web browsing, use of search engines, wireless network access, metadata generated by activity on the client device, click trough's on ads or hyperlinks, metadata included in images, media, video, audio, etc.) may take numerous forms including but not limited to electronic messages, emails, outputs from APP's, GUI's, Dashboards, and web site/web page activity on client devices 410. The one or more client devices 410 that are depicted in FIG. 4 may be devices from different manufactures, may run different operating systems (OS), and may communicate 421 using different communications protocols. Inquiries may be entered or otherwise input on a client device 410 using a voice interface, gesture recognition, stylus, finger, keyboard, touch screen, or other forms of user interface.

As one example, a traveler (e.g., a customer or buyer) may use a tablet/pad client device 410 to communicate 421 with a web site (e.g., network 105) that displays on a screen of the device 410, structured text 423 for items such as a drop down menu, one or more check boxes for selecting a property type, such as a "Condo", a "House", or an "Apartment" and other preferences such as a property which enforces or guarantees a "Non-Smoking" room and/or environment for its guests. In example 400, the traveler has selected a "Non-Smoking", "House" or "Condo" as preferences for the stay. The drop down menu may be used by the traveler to select other items such a payment method (e.g., VISA, MasterCard, PayPal, American Express, Bitcoin, etc.). Optionally or alternatively, the traveler may enter free text 442 in a field, screen, box, window, or other area presented on a display of client device 410. Here, the free text 442 may comprise one or more of the key terms used for detecting an event that may occur in a location, such as free text for "SXSW, Austin, Tex., Mar. 6-Mar. 18, 2014, 2bd, 2ba, Property". Here, stock terms in the free text 442 such as "Property", "2bd", and "2ba" may be removed or otherwise filtered out as described above. Other free text 442 terms such as stay dates "Mar. 6-Mar. 18, 2014", locality "Austin, Tex.", and potential event description "SXSW" may be extracted and processed by backend system 450 along with inquiries from other travelers to arrive at a high density of key terms indicative of an event being detected.

Backend system 450 may access received inquiries 101 to compute the density of background noise for inquiry data for use in the comparison with the density of key terms in making the determination that an actual event has been detected. Backend system 450 may access events data 115 to determine whether or not "SXSW" is an already known event. If the event is not a known event, backend system 450 may access one or more of curated research 107, customer service 415, network 105 or other resources to divine the meaning of "SXSW" as it relates to an event.

In some examples, user 412 (e.g., a traveler) may use a client device 410 (e.g., a phone, a smartphone, a tablet or pad) to contact customer service 415. Customer service 415 may listen to needs of user 415 for stay dates in Austin, Tex. from "Mar. 6-Mar. 18, 2014" to attend "South by South-West" and the user 412's need for a "2bd, 2ba, Property". Customer service 415 may enter the data supplied by user 412 as free text, structured text or both and communicate 421 that data to backend system 450.

Other travelers using other client devices 410 may also make inquiries similar to the above example, using email, electronic messaging, a dashboard, a GUI, or an APP on their client devices 410. As more and more travelers submit inquiries for the same locality, within a similar date range, for a specific event, the density of key terms for that event for the date terms, the locality terms or both may increase relative to the baseline density of inquiry data. As a result, the comparison of the density of key terms with the density of baseline inquiry data may indicate an event of interest to many travelers, and may prompt the generation of communications to owners of properties in vicinity of the locality to take action to communicate availability and terms for their respective properties to potential travelers and/or travelers that have submitted inquiries.

Application 452 may implement one or more stages of flow 100 or other process by which events may be detected (e.g., automatically detected) based on inquiries and the data included in those inquires. Application 452 may make one or more calls to other algorithms to obtain data (e.g., from 101, 103, 115, 105, 107, 415) from various sources and/or data stores. For example, application 452 may make application programming interface (API) calls. In some examples, APP's or other algorithms executing on client devices 410 or on systems in communications with client devices 410 may perform one or more stages of flow 100, including but not limited to filtering out stock terms at the stage 106, extracting date terms at the stage 108, extracting locality terms at the stage 112, or accessing and extracting additional locality terms at the stage 116, for example.

Backend system 450 may use communication access point 455 to communicate (421, 456) event notifications and/or promotions to owners, agents of owners, to travelers and other potential customers or clients, for example. Backend system 450 may be replicated at different geographical locations to detect events based on inquiries in those different geographical locations (e.g., in Europe, Asia, Far East, North America, South America, etc.).

Figure 5:
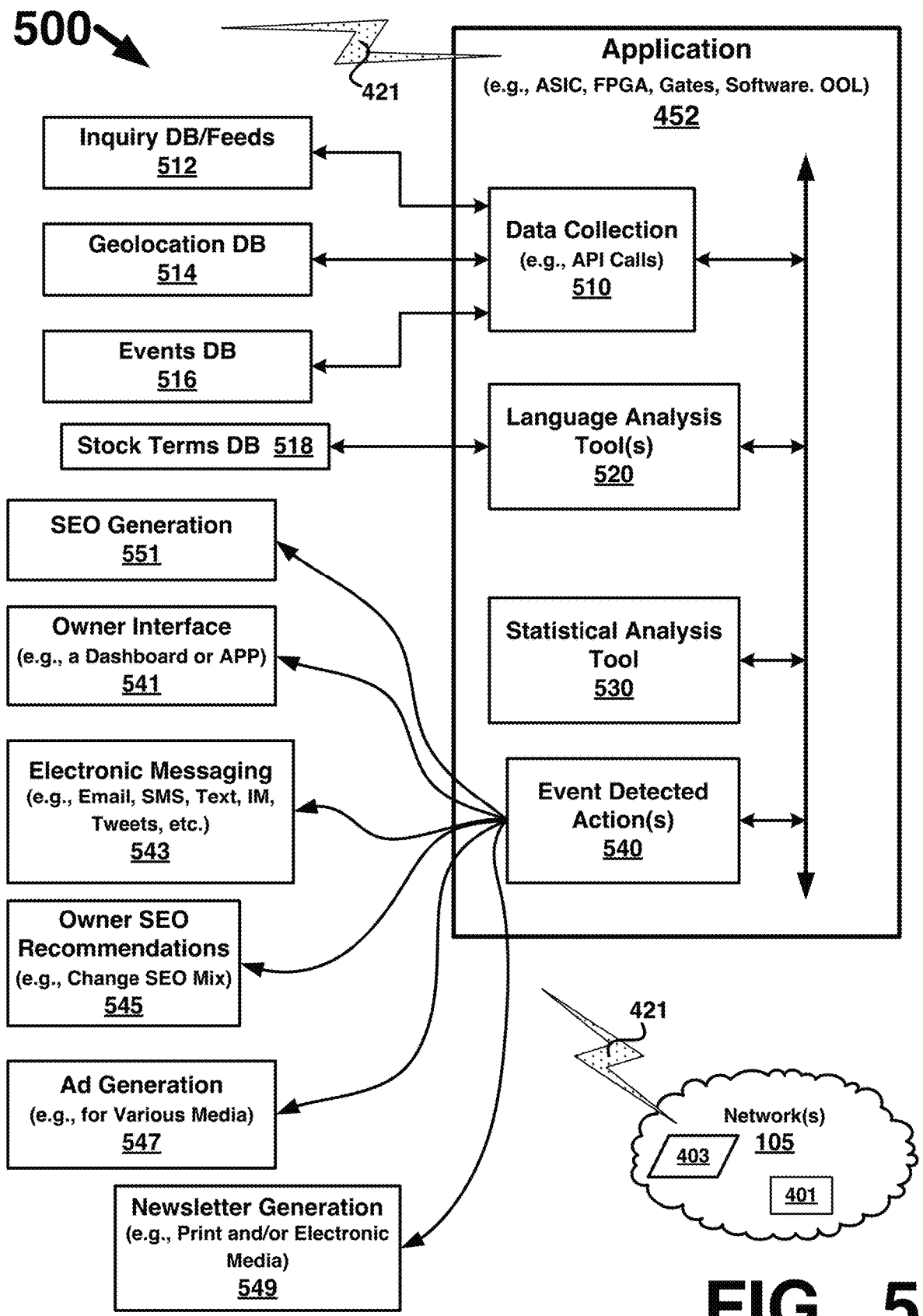
FIG. 5 depicts one example of a block diagram of an application to detect events using inquiries.

FIG. 5 depicts one example of a block diagram 500 of an application to detect events using inquiries. In block diagram 500, application 452 may include a data collection 510 utility being configured to collect data from one or more data stores (e.g., a data base (DB)) such as Inquiry DB/Feeds 512 to obtain inquiry data, Geolocation DB 514 to obtain location data, and Events DB 516 to obtain data on known events or to add newly detected events to the DB 516. Application 452 may include a language analysis tool 520 to analyze terms associated with dates, locality, and events, for example. Language analysis tool 520 may use semantic analysis tools and/or algorithms. Application 452 may include a statistical analysis tool 530 being configured to compare the density of key terms with the density of baseline inquiry data to determine if the density of key terms when compared with the density of baseline inquiry data indicates an event. Application 452 may include an event detected action(s) 540 utility being configured to take action, after an event or events have been detected, to notify/communicate, the event or events, and other relevant data to owners, agents of owners, travelers, and other potential customers or clients. Event detected action(s) 540 may generate or cause to be generated, information, electronic messages and other forms of communication including but not limited to search engine optimization (SEO) 551, information to be presented on an owner interface 541, electronic messaging 543 in one or more forms, owner SEO recommendations 545, ad generation 547 using one or more forms of media, and newsletter generation 549 (e.g., to owners, travelers, or other interested parties), for example. As one example, upon detecting the "SXSW" event in Austin, Tex., Event detected action(s) 540 may communicate 421 a text message to one or more owners stating that an event "SXSW" is surfacing in inquiries from travelers for stay dates in Austin, Tex. for the $2^{nd}$ and $3^{rd}$ weeks of March 2014. The text message may further advise the owners to change their SEO mix or terms to target searches for places to stay in Austin, Tex. during the "SXSW" music festival.

As another example, Event detected action(s) 540 may communicate 421 an electronic message in the form of a newsletter emailed to owners and highlighting interest in stay dates for the 2014 "SXSW" music festival in locations in and/or around Austin, Tex. Other forms of electronic messages may be communicated 421 to owners, agents of owners, travelers or other interested parties or potential customer and clients, such as Tweets, Instant Messaging (IM), SMS, push messages, push notifications, offers or ads included in content displayed in a browser, a web page, an email application, etc. Event detected action(s) 540 may address electronic messages to one or more addresses such as email addresses, web addresses (e.g., Uniform Resource Identifier (URI) or Uniform Resource Locator (URL)), SMS address (e.g., a cellular phone number), a Twitter handle, a social media address, a professional media address, Internet Protocol (IP) Address, Media Access Control (MAC) Address, physical address, Service Set Identifier (SSID), Bluetooth address, wired and/or wireless network address, or other forms of addresses and/or addressing that may be electronically communicated.

Figure 6:
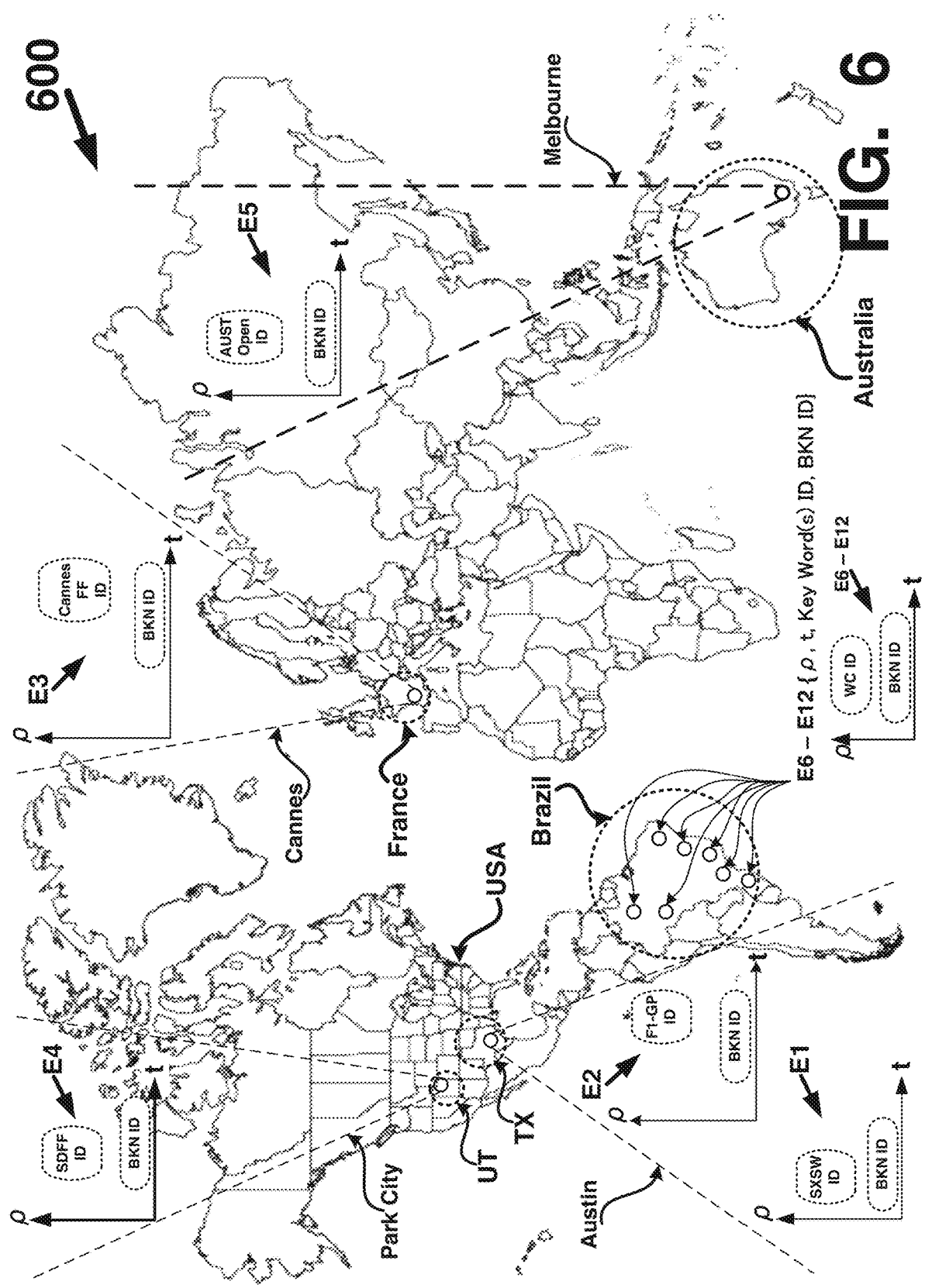
FIG. 6 depicts an example of locality of event detection using inquires.

FIG. 6 depicts an example 600 of locality of event detection using inquires. Events that may occur in a broader geographical jurisdiction denoted by the dashed circles, such as the United States of America (USA) or a state in the USA, a country in Europe or the European Union (EU), Brazil or Australia may lack sufficient locality and may be narrowed down to smaller geographical areas, denoted by the smaller solid circle within the dashed circles, such as: Park City, Utah; Austin, Tex.; Cannes, France; Melbourne, Australia, or several World Cup Soccer sites in various cities of Brazil, for example.

In example 600, inquiry data may surface two events (E1, E2) in locality Austin, Tex., for SXSW music festival and F1-GP auto racing, respectively. Surfaced events (E1, E2) may occur at different a time t and at different locations in or around Austin, Tex., for example. Furthermore, each event (E1, E2) may have a different key term density ρ vs. time t graph. Background (BKN ID) baseline noise inquiry data for each event (E1, E2) may also be different. An event E3 may surface from inquiry data related to the City of Cannes, France where the key terms may reference the Cannes Film Festival. An event E4 may surface key terms associated with the Sundance Film Festival in locality Park City, Utah. Another event E5 may surface key terms associated with the Australian Open Tennis Tournament held in locality Melbourne, Australia.

In the nation of Brazil, events E6-E12 may surface key terms associated with different World Cup Soccer venues that are held at different cities in Brazil (e.g., localities such as Rio de Janeiro, Recife, Manaus, Natal, Cuiaba, Porto Alegre, Belo Horizonte, Brasilia, Salvador, Fortaleza, etc.). Each of the events E6-E12 may occur at different a different time t and may have different key word densities ρ (WC ID) and Background (BKN ID) baseline noise inquiry data that is specific to each locality and the events occurring there. Events E1-E12 may be processed by different backend systems 450 or the same backend system 450. Backend system 450 may be included in a centralized service in communication with one or more networked computing devices, networked data stores, networked compute engines, networked servers, networked client devices, networked wireless client devices or other networked computing systems or devices.

The centralized service may include a vacation rental company, a car rental company, a leasing agency, a real estate agency or other, for example. Although a listing or property for lease, sale or rent have been described above, the present application may include other forms of property (e.g., a res) and/or services, including but not limited to personal property, real property, transportation, cleaning services, transportation services, health services, personal services, food services, restaurant services, rented goods, leased goods, and other goods and/or services in commerce, just to name a few. In some examples, one or more of the stages of flow 100 may be performed by the centralized service. In other examples, one or more of the stages of flow 100 may be distributed among a plurality of the backend systems 450 and each backend system may communicate (421, 456) data with other backend systems and/or the centralized service. Curated research 107 and/or customer service 415 may be included in the centralized service as a central resource or as a distributed resource (e.g., curated research 107 and/or 415 distributed among different backend services 450).

Although the foregoing examples have been described in some detail for purposes of clarity of understanding, the above-described conceptual techniques are not limited to the details provided. There are many alternative ways of implementing the above-described conceptual techniques. The disclosed examples are illustrative and not restrictive.

What is claimed is:

1. A computer-implemented method for detecting events using inquiries, the computer-implemented method comprising:
   under control of a computing system comprising one or more processors configured to execute specific instructions,
   accessing, via an application programming interface ("API") of a data store, inquiry data representing inquiries associated with rental property, wherein the inquiry data comprises:
     a stock term associated with rental property; and
     non-stock terms, wherein the non-stock terms include at least a key term, a date term corresponding to a rental property stay date, and a locality term corresponding to a rental property stay location;
   accessing, via the API, baseline data representing a baseline measurement of a first frequency with which a non-stock term appears in the inquiries;
   identifying data representing one or more date terms in the inquiry data;
   identifying data representing one or more key terms in the inquiry data;
   identifying data representing one or more locality terms in the inquiry data;
   generating density data representing a measurement of a second frequency with which a first key term of the one or more key terms appears in the inquiry data in connection with at least one of (i) a date term of the one or more date terms, or (ii) a locality term of the one or more locality terms;
   analyzing the density data with respect to the baseline data;
   determining, based at least partly on the second frequency exceeding the first frequency, that a future event associated with the first key term is likely to occur in a locality corresponding to the locality term on a date corresponding to the date term;
   identifying an entity based at least partly on data associating the entity with the locality; and
   transmitting, to the entity, an electronic message that includes data representing the future event.

2. The computer-implemented method of claim 1, wherein identifying the entity comprises identifying a proprietor of a rental property associated with the locality.

3. The computer-implemented method of claim 1, further comprising performing a semantic analysis of at least a subset of the inquiry data to identify the one or more date terms, the one or more key terms, or the one or more locality terms.

4. The computer-implemented method of claim 1, further comprising:
   determining data representing a key term frequency for the first key term;
   determining data representing an inverse inquiry frequency associated with inquiry data that includes the first key term; and
   calculating data representing a product of the key term frequency and the inverse inquiry frequency.

5. The computer-implemented method of claim 4, further comprising applying data representing a key term weighting factor to the product.

6. The computer-implemented method of claim 1, wherein the density data is generated based at least partly on analysis of: the one or more date terms; the one or more locality terms; or both the one or more date terms and the one or more locality terms.

7. The computer-implemented method of claim 1, wherein the one or more key terms identified in the inquiry data are derived from data representing free text included in the inquiry data.

8. The computer-implemented method of claim 1, further comprising:
   determining that a location corresponding to a first term in an inquiry of the inquiries associated with rental property is within a threshold distance of a predetermined locality; and
   identifying the first term as an instance of a locality term that corresponds to the predetermined locality.

9. The computer-implemented method of claim 1, further comprising:
   determining the baseline data using a first portion of the inquiry data, wherein the first portion is associated with a first time period, and wherein the first time period includes the date corresponding to the date term; and
   determining second baseline data using a second portion of the inquiry data, wherein the second portion is associated with a second time period, and wherein the second time period does not include the date corresponding to the first date term.

10. A system for detecting events using inquiries, the system comprising:
    an inquiries data store storing:
       inquiry data representing inquiries associated with rental property, wherein the inquiry data comprises:
          a stock term associated with rental property; and
          non-stock terms, wherein the non-stock terms include at least a key term, a locality term corresponding to a rental property stay location, and a date term corresponding to a rental property stay date; and
       baseline data representing a baseline measurement of a first frequency with which a non-stock term appears in the inquiries;
       wherein the inquiries data store exposes an application programming interface ("API") to provide access to data in the inquiries data store; and
    one or more computer processors in communication with the inquiries data store and programmed by executable instructions to at least:
       access, via the API, the inquiry data stored in the inquiries data store;
       identify one or more date terms, one or more locality terms, and one or more key terms in the inquiry data;
       determine a measurement of a second frequency with which a first key term of the one or more key terms appears in the inquiry data in connection with at least one of a date term of the one or more date terms or a locality term of the one or more locality terms;
       analyze the measurement of the second frequency of the first key term with respect to the baseline measurement of the first frequency of the first key term;
       determine, based at least partly on the second frequency exceeding the first frequency, that a future event associated with the first key term is likely to occur in a locality corresponding to the locality term on a date corresponding to the date term;
       identify an entity based at least partly on data associating the entity with the locality; and
       transmit, to the entity, an electronic message comprising information regarding the future event.

11. The system of claim 10, wherein the one or more processors are further programmed by the executable instructions to perform a semantic analysis of the one or more date terms, the one or more key terms, or the one or more locality terms.

12. The system of claim 10, wherein the one or more processors are further programmed by the executable instructions to at least:
    generate data representing a key term frequency for the first key term;
    generate data representing an inverse inquiry frequency associated with inquiry data that includes the first key term;
    calculate data representing a product of the key term frequency and the inverse inquiry frequency; and
    apply data representing a key term weighting factor to the product.

13. The system of claim 10, wherein to identify the entity, the one or more processors are further programmed by the executable instructions to at least identify a proprietor of a rental property associated with the locality.

14. The system of claim 10, wherein the electronic message includes data representing an address of a property owner having property in a locality of the future event.

15. The system of claim 10, wherein the first frequency comprises a frequency with which any non-stock term is expected to appear in the inquiries.

16. The system of claim 10, wherein the date corresponding to the date term comprises one of a range of dates during which the future event is likely to occur.

17. The system of claim 10, wherein the one or more computer processors are programmed by further executable instructions to at least generate search engine optimization data based at least partly on the future event, and wherein to transmit the electronic message to the entity, the one or more computer processors are programmed by further executable instructions to automatically apply the search engine optimization data to a network resource associated with a proprietor of a rental property associated with the locality.

18. The system of claim 10, wherein the one or more computer processors are programmed by further executable instructions to at least generate an electronic media item based at least partly on the future event, and wherein to transmit the electronic message to the entity, the one or more computer processors are programmed by further executable instructions to automatically publish the electronic media item to a network resource associated with rental property.

19. A non-transitory computer readable medium, comprising machine executable instructions configured to cause a computing system to at least:

access, via an application programming interface ("API"), inquiry data representing inquiries associated with rental property;

access, via the API, baseline data representing a baseline measurement of a first frequency with which a background noise term appears in the inquiries;

identify data representing one or more date terms in the inquiry data;

identify data representing one or more key terms in the inquiry data;

identify data representing one or more locality terms in the inquiry data;

generate density data representing a measurement of a second frequency with which a first key term of the one or more key terms appears in the inquiry data in connection with at least one of a date term of the one or more date terms or a locality term of the one or more locality terms;

analyze the density data with respect to the baseline data;

determine, based at least partly on the second frequency exceeding the first frequency, that a future event associated with the first key term is likely to occur in a locality corresponding to the locality term on a date corresponding to the date term;

identify an entity based at least partly on data associating the entity with the locality; and transmit, to the entity, an electronic message that includes data representing the future event.

20. The non-transitory computer readable medium of claim 19, wherein the background noise term is part of a group of terms that are not present in a set of stock terms associated with rental property, and wherein each background noise term in the group of terms is expected to occur in inquiries at the first frequency.

* * * * *